Patented Feb. 23, 1926.

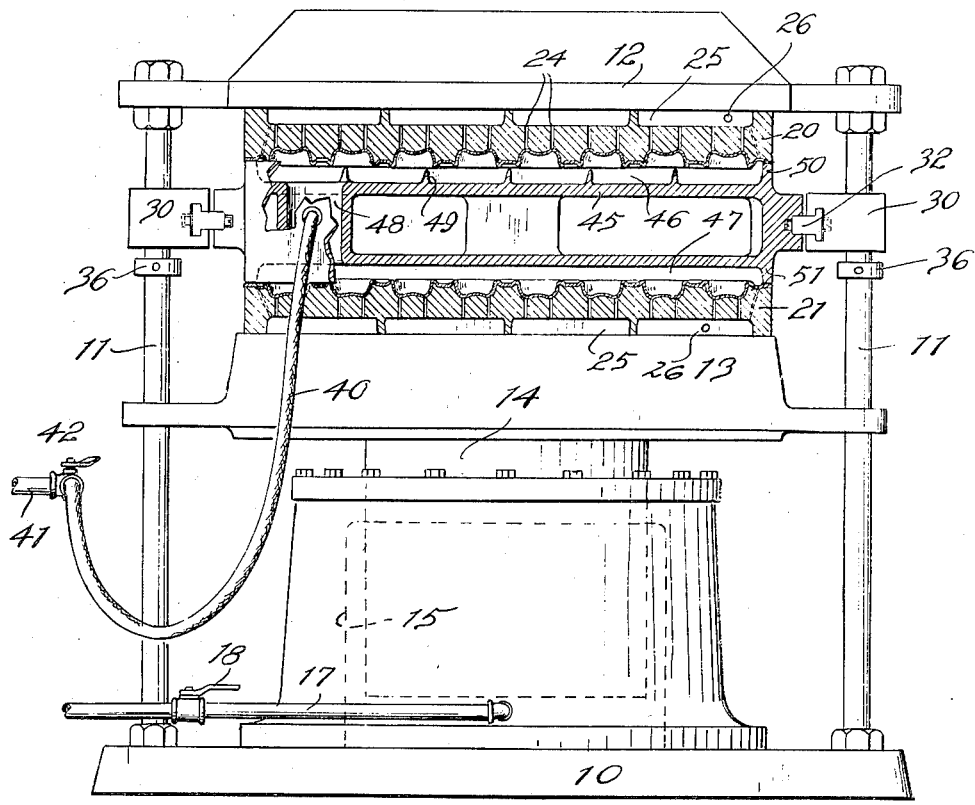
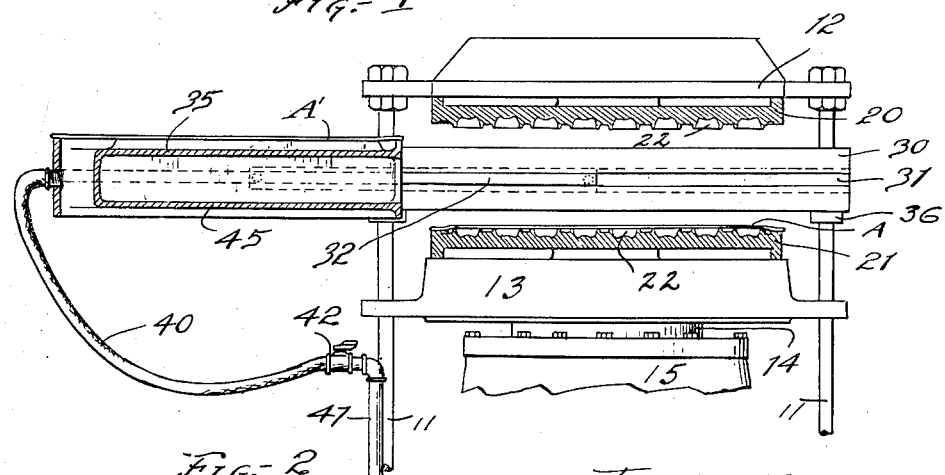

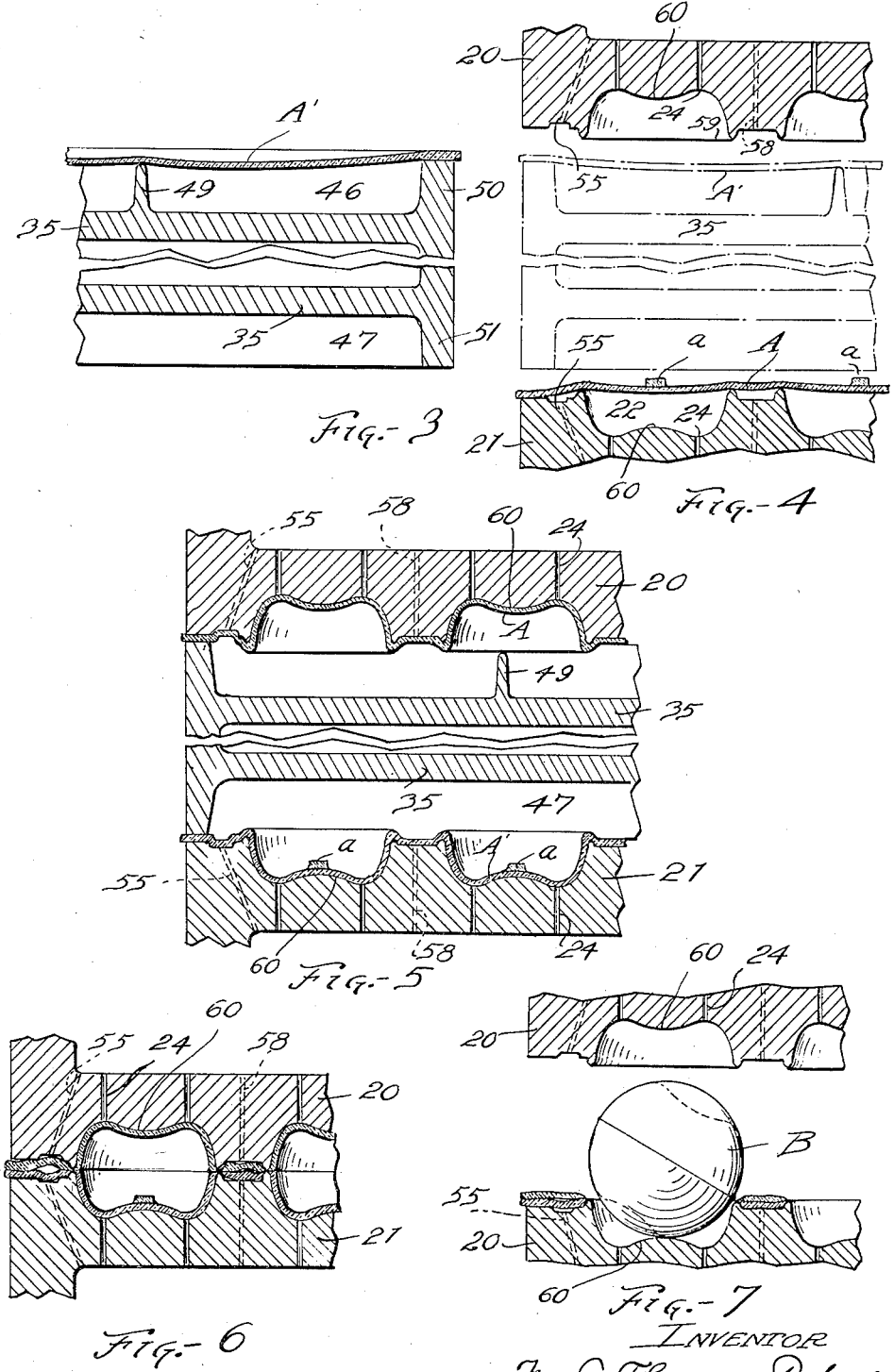

1,574,060

UNITED STATES PATENT OFFICE.

FRED THOMAS ROBERTS, OF PHILADELPHIA, PENNSYLVANIA, ASSIGNOR TO PARAMOUNT RUBBER CONSOLIDATED, INC., OF TUCKAHOE, NEW YORK, A CORPORATION OF DELAWARE.

METHOD FOR MAKING HOLLOW RUBBER ARTICLES.

Application filed July 8, 1921. Serial No. 483,285.

*To all whom it may concern:*

Be it known that I, FRED THOMAS ROBERTS, a citizen of the United States, residing at Philadelphia, in the county of Philadelphia and State of Pennsylvania, have invented a certain new and useful Improvement in Methods for Making Hollow Rubber Articles, of which the following is a full, clear, and exact description, reference being had to the accompanying drawings.

This invention relates to the manufacture of hollow articles of plastic material wherein the article is formed in mold cavities by fluid pressure. The object is to enable the rapid and economical formation of hollow articles from sheet stock. My process is very effective in forming a large number of articles simultaneously. The invention is hereinafter more fully described in connection with an embodiment shown in the drawings which illustrates the invention as applied to the manufacture of balls.

In the drawings, Fig. 1 is a side elevation of a machine which may be employed in connection with my process; Fig. 2 is a sectional side elevation on a reduced scale at right angles to Fig. 1; Fig. 3 is a vertical section through a combined carrier and air distributor which I employ; Fig. 4 is a side elevation of two mold members showing the carrier in broken lines in position between them; Fig. 5 is a vertical section through two mold members and the intermediate carrier after the stock has been pneumatically seated; Fig. 6 is a section through two mold members after the carrier has been removed and the mold members brought together; Fig. 7 is a vertical section through the two mold members after they are separated and the primary formation of the article has been completed.

In the apparatus shown in Figs. 1 and 2, 10 indicates the base of a mold press, 11 upright rods rising therefrom, and 12 the stationary head of the press. 13 designates a movable platen guided by the rods 11 and mounted on the upper end of a plunger 14 operating in a stationary upright cylinder 15. Hydraulic pressure may be admitted to this cylinder through a pipe 17 controlled by a suitable valve as 18.

20 and 21 designate the two mold plates, each of which is formed with cavities dependent upon the shape of the article to be made. In the particular form shown in the drawing, each mold member has numerous cavities 22 which are bowl-shaped. Each of the cavities is connected by venting passageways 24 with a chamber 25 in the base of the mold which is vented to the atmosphere, as for instance through the passageway 26. The molds are held to the head of the press and the platen respectively by any suitable means not shown.

Mounted on the upright rods 11 at each side of the press are shown a pair of guide bars 30 having undercut horizontal channels 31 on their inner faces. Sliding in these channels are extension bars 32. Sliding on the extension bars is a peculiarly formed carrier 35 to be hereinafter described. The guide bars 30 are vertically movable on the respective frame rods 11, suitable collars 36 on these rods being adapted to support the bars when the press is idle.

It will be seen that when the mold members are separated a sheet of rubber or similar material may be laid manually on the top of the mold member 21, and another sheet laid on the top of the carrier 35 when it is withdrawn from between the molds, and thereafter the carrier may be shoved into place between the molds, thus bringing its sheet directly beneath the mold 20. Such sheets are shown at A and A¹ respectively in Fig. 2.

The carrier 35 is hollow and has an open top and bottom. Communicating with the carrier is a flexible pipe 40 leading from a source of compressed air 41 under the control of a valve 42. To reduce the capacity of the carrier, thereby preventing waste of air and at the same time have it of sufficient height to allow convenient manipulation between the molds, I form the carrier with an interior box-like filler 45. This may conveniently be a hollow member open at one edge. The space above the filler forms a pneumatic chamber 46 directly beneath the upper mold, while the space below the filler forms a pneumatic chamber 47 directly above the lower mold. These two chambers are connected by a passageway 48, with which the flexible pipe 40 directly communicates. On the upper surface of the filler 45 there are preferably ribs 49 adapted to support the plastic sheet A¹.

The carrier is formed with vertical flanges 50 and 51 extending entirely around it at its extreme margin, which flanges are adapted to coact with the mold members. In the face of these mold members just inside of this marginal portion are formed shallow grooves 55.

In employing such an apparatus as described in carrying out my process, a sheet of rubber or other plastic stock A is cut substantially the size of one of the mold members and placed, manually or otherwise, over the lower mold member 21 as shown at A, in Fig. 4. A sheet of plastic stock A¹ is placed on the carrier as shown in Fig. 3; then the carrier is moved between the mold members and the hydraulic press is operated to bring the mold members sufficiently together to cause the flange 50 and 51 to press the respective plastic sheets directly against the marginal portion of the mold members. This makes an airtight seal at such margin. I then open the valve 42 and admit compressed air to the chambers 46 and 47. This seats the plastic stock in the mold cavities as shown in Figs. 1 and 5. The stock is also seated by this same pneumatic action in the shallow grooves 55 surrounding the set of cavities and also in the space between the cavities.

All of the cavities as well as the intervening spaces and the groove 55 are vented to the atmosphere; thus the internal pneumatic pressure may force the sheet into close contact with the mold surface. The surrounding channel 55 and the spaces 58 between the mold cavities being comparatively shallow, the stock is seated at these points before it is completely seated in the cavities themselves. This insures the sheet being properly held and prevents any buckling as the sheet becomes stretched in seating in the cavities. Each cavity is provided with a raised annular rib 59 coming to a somewhat blunt double beveled edge as shown. Such raised edges automatically provide for the lowered space 58 between the cavities.

After the stock has been seated as shown in Figs. 1 and 5 the valve 42 is closed, the mold members separated by a lowering of the platen 13 and the carrier slid laterally out from between the mold members. Then hydraulic pressure is admitted to the cylinder 15 to raise the lower member into coaction with the upper. This brings the two seated sheets into junction at the raised cutting edges and peripheral seams are thereby formed about each article and the surplus stock is sheared off by the opposed cutting edges as shown in Fig. 6. Then the mold members are separated and the articles lying loosely in the cavities of the lower mold are free for removal as shown at B in Fig. 7.

As heretofore stated, the particular form of mold cavities shown is selected for the manufacture of balls. These cavities are hemispherical except for an inward protuberance 60, which materially reduces the necessary depth of cavities and insures a more uniform seating. This feature is shown and claimed in my prior patent, Reissue No. 14,604, dated March 4, 1919. As the two mold members coming together cause the edges of the rubber stock to touch, the atmospheric air within the article is thereby entrapped and the further movement of these mold members toward each other (equal substantially to twice the thickness of the plastic stock) reduces the cubical contents of the hollow articles, so that the pressure within them is raised somewhat above the atmosphere. This causes the inward protuberance therein to blow outwardly so that the article assumes a spherical shape and tends to lift itself free from the cavity as shown in Fig. 7 as soon as the mold members are separated.

In using the process for manufacturing rubber articles, the formed article as shown in Fig. 7 is transferred to a vulcanizing mold and vulcanized by suitable internal pressure. This internal pressure may be obtained for instance by placing a small quantity of water in the portions of rubber seated in the lower mold cavities, which becomes steam when the articles is subjected to a vulcanizing heat. For some classes of material this subsequent vulcanization need not be effected.

If balls made by this process are to be inflated, a series of small para rubber plugs (a, Figs. 4 and 5) may be placed on the sheet A, preferably before the latter is put over the mold, in such position that there is one plug for each cavity. After vulcanization, a hypodermic needle may be passed through the wall of the article and through this plug and inflating air thus admitted, the plug serving to seal this opening when the needle is withdrawn.

It should be noted particularly that in carrying out my process I secure the sheet in regions surrounding all of the mold cavities and subject the sheet to pneumatic pressure, not only opposite the cavities but opposite the intermediate spaces, so that the sheet is held effectively around each cavity outside of and independent of the raised cutting edges. This is important since my experience indicates that without such holding independent of the cutting edges, the rubber stock is liable to wrinkle and buckle and does not seat uniformly. Moreover the adherence of the rubber to the mold face between and around the cavities is a valuable factor in holding the rubber in place between the seating operation and the final bringing of the mold members together. I also make the vents from the cavities, spaces and channels of very small bore (being exaggerated in the drawings for clearness of illustration) so that the air can only pass back against the inner side of the sheet very gradually. There is accordingly ample time to remove the air distributor, place the expansible material in the lined cavities and bring the molds together before material separation takes place between the seated stock and the mold surface.

It should be noted that the apparatus shown in the drawings hereof is claimed in a companion application of mine Serial No. 495,489, filed August 26, 1921.

Having thus described my invention, I claim:

1. The method of making hollow articles of plastic material comprising seating sheet stock in mold cavities and against adjacent portions of the mold around the cavities by fluid pressure higher than atmospheric which is exerted uniformly on the stock opposite the cavities and opposite such adjacent regions, thereafter removing such pressure and joining such stock while it is still seated to other stock.

2. The method of making hollow articles of plastic material comprising seating sheet stock in mold cavities and against the regions between the cavities by compressed fluid uniformly applied to the sheet opposite the cavities and opposite such regions, then releasing the fluid, and thereafter joining said seated stock to other stock.

3. The method of making hollow articles of plastic material comprising pneumatically seating the stock in a series of cavities and at the same time in depressions between the cavities by the action of compressed fluid uniformly acting on that face of the stock which is opposite the cavities and intermediate regions, then removing the immediate source of fluid and bringing such seated stock in conjunction with other stock before the seated stock has time to materially separate from the mold surface.

4. The method of making hollow articles of plastic material consisting of placing sheet stock across the mouths of opposed mold cavities, subjecting such stock to the action of compressed fluid opposite the cavities and opposite the spaces around the cavities while clamping the perimeter of the sheet stock, then releasing the fluid and thereafter bringing the mold members together to join the seated stock.

5. The method of making hollow articles of plastic material consisting of placing sheet stock across the mouths of opposed mold cavities, enclosing the space between the molds, said space being bounded above and below by the said stock, admitting compressed fluid to such enclosed space so that it may uniformly act on the stock opposite the cavities and also opposite the spaces between the cavities, then removing the enclosure, and thereafter bringing the mold members together to join the seated stock.

6. The method of making hollow articles of plastic material comprising placing two sheets across the mouths of two cooperating mold members, supplying compressed fluid to the space between the mold members while venting the mold cavities and the regions between them, such compressed fluid operating to seat the stock, not only in the mold cavities, but also between the cavities, then releasing the compressed fluid and thereafter bringing the mold members together.

7. The method of making hollow articles of plastic material comprising placing two sheets across the mouths of two cooperating cavitary mold members, placing an enclosing wall between the mold members, said wall engaging the marginal portions of the sheets while leaving the intermediate regions free, supplying compressed fluid to the space within the wall which acts on the stock, not only opposite the mold cavities, but also opposite the spaces between the cavities, then removing said wall, and thereafter bringing the mold members together.

8. The method of making hollow articles of plastic material comprising placing a sheet of stock across the top of an upwardly facing lower mold and placing a sheet of stock across the bottom of a downwardly facing upper mold, closing the marginal space between the molds while having free communication between the interior of such marginal closure and substantially the entire surface of the sheet stock, submitting compressed fluid to such enclosed space to seat the stock, thereafter removing such closing means, and bringing the mold members together while the stock is still seated in its cavities.

9. The method of making hollow articles of plastic material comprising placing a sheet of stock across the top of an upwardly facing lower mold and placing a sheet of stock across the bottom of a downwardly facing upper mold, placing between the molds a hollow member having a surrounding edge wall and having its entire top and bottom open, submitting compressed fluid to such hollow member to seat the stock, thereafter removing such hollow member, and bringing the mold members together while the stock is still seated in its cavities.

10. The method of making hollow articles of plastic material comprising clamping the marginal portion of two sheets of stock across the mouths of two facing mold members, supplying compressed fluid to a region bounded by the mold members, and the marginal clamping means said fluid acting uniformly on the stock opposite the cavities and opposite the spaces between the cavities, and thereafter removing the barrier between the mold members and bringing them into coction.

11. The method of making hollow articles consisting of placing sheet stock across the mouths of two cooperating mold members, placing between the mold members a closure which clamps the marginal portion of the stock against them while leaving the edges of the cavities free, supplying compressed fluid to such closure to seat the stock, then withdrawing the closure and bringing the mold members together to shear off the seated stock.

12. The method of making hollow articles of plastic material comprising mechanically clamping the marginal portion of two sheets of stock across the mouths of two facing mold members, each of which has cavities surrounded by cutting edges without compressing the stock continuously along such edges, supplying compressed fluid to the region between the mold members, said fluid acting on the stock opposite the cavities and opposite the spaces between the cavities, and thereafter removing the barrier between the mold members and bringing them into coaction.

13. The method of forming hollow articles of plastic material comprising disposing two sheets of plastic stock between coacting dies having coacting cavities, and placing between such sheets an intermediate frame entirely open toward the respective cavities and the spaces between them but having a relatively thin wall, and causing such thin wall to clamp the stock against the mold members outside of the cavitary region, and admitting fluid under pressure to the interior of the frame.

14. In the method of making hollow articles of plastic material, by confronting dies having confronting cavities, the cavity in each die being defined by an outstanding edge, the step of employing a frame disposed between the two dies and between sheets of plastic stock, said frame being entirely open on both faces, and there being means whereby fluid may be forced into the space within the frame.

15. In the method of making hollow articles of plastic material, by the employment of opposed dies having confronting cavities, the dies being formed with cutting edges defining said cavities, and there being depressed spaces surrounding the cutting edges of the dies, and the employment of an open frame or air chamber adapted to extend over the entire area of the die body and rest against only the outer margin of the die bodies, and being entirely open on its opposite faces, the steps of bringing such frame into coaction with the two die bodies to clamp two sheets of stock at the margin, without clamping it at the edges of the individual cavities, then supplying fluid under pressure to the interior of the frame to seat such stock, both in the cavities and in the region between the cavities, then separating the die members and removing the frame, and then bringing the die members into coaction to join and cut off the seated stock.

16. The method of forming hollow articles of rubber, by the employment of opposed confronting dies, each having a confronting cavity, the edge of which is defined by an outstanding wall forming a cutting edge, consisting of placing between such dies a hollow frame, entirely open above and below opposite both the cavities and the spaces between them, and placing sheets of rubber stock between the frame and the respective dies, both above and below, then bringing the die members toward each other to cause the frame to clamp the marginal region of the stock while leaving the intermediate portion free opposite both the cavities and the regions between them, then supplying compressed air to the interior of said frame to seat the stock in the cavities and the intermediate regions, then removing the frame, and then bringing the dies together to join the seated stock.

17. The method of making hollow articles of plastic material which consists in first clamping two sheets of such material respectively between a pair of opposed cavitary mold members and an intermediate open frame which serves to secure the sheets in a marginal region about the entire set of cavities in the mold members, while leaving it free opposite the cavities and opposite the spaces around the cavities, and then supplying fluid under pressure to said intermediate frame to seat the stock in the cavities and against the intermediate regions of both the mold members.

In testimony whereof, I hereunto affix my signature.

FRED THOMAS ROBERTS.